United States Patent
Kita et al.

(10) Patent No.: US 8,082,080 B2
(45) Date of Patent: Dec. 20, 2011

(54) ELECTRIC POWER STEERING APPARATUS

(75) Inventors: Masayuki Kita, Okazaki (JP); Terutaka Tamaizumi, Okazaki (JP); Akihiko Nishimura, Okazaki (JP); Shinya Aono, Okazaki (JP); Jun Hasegawa, Okazaki (JP); Akira Nambu, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 377 days.

(21) Appl. No.: 12/476,688

(22) Filed: Jun. 2, 2009

(65) Prior Publication Data
US 2009/0299575 A1 Dec. 3, 2009

(30) Foreign Application Priority Data
Jun. 2, 2008 (JP) .................................. 2008-144913

(51) Int. Cl.
*B62D 6/00* (2006.01)
(52) U.S. Cl. ........................... 701/42; 180/443; 318/432
(58) Field of Classification Search .................... 701/42, 701/41; 180/443, 6.2, 6.28; 318/432; *B62D 6/00*
See application file for complete search history.

(56) References Cited

U.S. PATENT DOCUMENTS

| | | | |
|---|---|---|---|
| 5,473,231 A | 12/1995 | McLaughlin et al. | |
| 5,504,403 A | 4/1996 | McLaughlin | |
| 7,828,112 B2 * | 11/2010 | Kezobo et al. | 180/446 |
| 2001/0023382 A1 | 9/2001 | Kurishige et al. | |
| 2001/0052756 A1 * | 12/2001 | Noro et al. | 318/432 |
| 2002/0092700 A1 * | 7/2002 | Kim et al. | 180/446 |
| 2005/0182541 A1 * | 8/2005 | Tamaizumi et al. | 701/41 |
| 2007/0227806 A1 * | 10/2007 | Wei | 180/446 |
| 2008/0047775 A1 * | 2/2008 | Yamazaki | 180/443 |
| 2008/0147276 A1 * | 6/2008 | Pattok et al. | 701/42 |
| 2008/0208407 A1 * | 8/2008 | Tanaka et al. | 701/41 |
| 2008/0262678 A1 * | 10/2008 | Nishimura et al. | 701/42 |
| 2009/0055050 A1 * | 2/2009 | Onuma et al. | 701/43 |
| 2009/0069981 A1 | 3/2009 | Barthomeuf et al. | |
| 2011/0022272 A1 * | 1/2011 | Hung et al. | 701/42 |

FOREIGN PATENT DOCUMENTS

| | | |
|---|---|---|
| EP | 0 681 955 A1 | 11/1995 |
| EP | 1 129 926 A1 | 9/2001 |
| JP | 10-278827 | 10/1998 |
| JP | 2006-142932 | 6/2006 |
| WO | WO 2006/099483 A1 | 9/2006 |
| WO | WO 2007/045735 A1 | 4/2007 |

* cited by examiner

OTHER PUBLICATIONS

U.S. Appl. No. 12/435,046, filed May 4, 2009, Tamaizumi, et al.

*Primary Examiner* — Tuan C. To
(74) *Attorney, Agent, or Firm* — Oblon, Spivak, McClelland, Maier & Neustadt, L.L.P.

(57) ABSTRACT

An electric power steering (EPS) apparatus 1 includes a motor 12, an EPS actuator 10, a torque sensor 14, and an ECU 11. The EPS actuator 10 uses the motor 12 as a drive source to apply assist force to a steering system, thereby assisting a steering operation. The torque sensor 14 detects a steering torque $\tau$ of the steering system. The ECU 11 controls the operation of the EPS actuator 10. Based on the steering torque $\tau$ detected by the torque sensor 14, the ECU 11 computes a basic shift amount $\epsilon ts\_b$ of the assist force applied to the steering system. The ECU 11 determines which one of returning, holding, and turning is the state of the steering operation. When the state of the steering operation is returning or holding, the ECU 11 executes compensation control for correcting the steering torque $\tau$, which is used in the computation of the basic shift amount $\epsilon ts\_b$ of the assist force, thereby increasing the assist force applied to the steering system. The ECU 11 subjects the steering torque shift control amount $\epsilon ts$ to a filtering process using a low pass filter, thereby inhibiting the steering torque shift control amount $\epsilon ts$ from sharply changing. When the state of the steering operation is turning, the ECU 11 changes a filter constant of the low pass filter so as to reduce the filtering effect.

6 Claims, 6 Drawing Sheets

ELECTRIC POWER STEERING APPARATUS

CROSS-REFERENCE TO RELATED APPLICATIONS

This application is based upon and claims the benefit of priority from prior Japanese Patent Application No. 2008-144913, filed on Jun. 2, 2008, the entire contents of which are incorporated herein by reference.

BACKGROUND OF THE INVENTION

The present invention relates to an electric power steering apparatus.

Conventionally, electric power steering (EPS) apparatus using a motor as a drive source have been known as vehicle power steering apparatuses. In a typical EPS apparatus, various compensation control procedures are executed to further improve the steering feel.

For example, the state of a steering operation executed by the driver (steering state) includes "turning" for increasing the steering angle, "holding" for maintaining the steering angle, and the "returning for reducing the steering angle. The steering feel experienced by the driver changes in each steering state. The steering feel tends to change significantly during a transition between steering states.

Accordingly, Japanese Laid-Open Patent Publication No. 2006-142932 discloses an EPS apparatus that executes compensation control procedure according to the steering state. Prior to the computation of a basic assist control amount, the EPS apparatus disclosed in the publication corrects the value of steering torque, which will be used as a base of the computation, in accordance with the steering state (steering torque shift control). That is, by simply correcting the steering torque prior to the computation of the basic assist control amount, assist performance that is appropriate for each steering state is achieved. Specifically, in the "holding" and in the "returning", the steering torque shift control is executed such that the basic assist control amount (the absolute value thereof) is increased. This reduces the load on the driver required for the "holding". Also, the driver is prevented from feeling disturbed when the steering state is switched from the "holding" to the "returning", so that favorable steering feel is maintained.

When executing the compensation control procedure, a compensation component is passed through a low pass filter (LPF), so that sharp changes in assist force is inhibited. Therefore, favorable steering feel is achieved.

However, in cases where the steering torque shift control is executed to increase the assist force during the "holding" and the "returning", the execution of the filtering process for preventing the assist force from being sharply changing (sharp change prevention) can degrade the steering feel.

That is, in many cases, the steering operation is performed in the order of the "turning" from the neutral position of the steering wheel, the "holding", and the "returning" to the neutral position. Thus, the sharp change prevention is particularly effective in inhibiting an sharp change of the assist force when the steering state is switched from the "holding" to the "returning".

However, in reality, the steering state is changed directly to the "turning" from the "holding" or from the "returning" without a sufficient time at the neutral position in some cases. In such a case, the execution of the sharp change prevention process retards the reduction of the assist force, which has been increased during the "holding" or the "returning. As a result, the assist force becomes excessive, and the steering feel experienced by the driver is degraded. Degraded steering feel includes excessively small resistance during "turning," accompanying reduction of road information, and a reduced sensation of the "turning" subsequent to the "holding" or the "returning". Thus, the above compensation control still has room for improvement.

SUMMARY OF THE INVENTION

Accordingly, it is an objective of the present invention to provide an electric power steering apparatus that achieves a favorable steering feel when the steering state is switched to the "turning" subsequent to the "holding" or the "returning."

To achieve the foregoing objective and in accordance with one aspect of the present invention, an electric power steering apparatus including a motor, a steering force assist device, a torque sensor and a controller is provided. The steering force assist device uses the motor as a drive source to apply assist force to a steering system, thereby assisting a steering operation. The torque sensor detects a steering torque of the steering system. The controller controls the operation of the steering force assist device. The controller includes a computation section, a compensation section, and a filtering section. The computation section computes a basic assist force applied to the steering system based on the steering torque detected by the torque sensor. The compensation section computes a compensation amount that compensates for the steering torque used in the computation of the basic assist force, thereby adjusting the basic assist force. The filtering section subjects the compensation amount obtained at the compensation section to a filtering process with a filter constant that represents the degree of filtering effect. The state of the steering operation includes a turning for increasing the steering angle, a holding for maintaining the steering angle, and a returning for reducing the steering angle. The controller determines which one of said returning, said holding, and said turning the state of the steering operation is. When the state of the steering operation is said returning or said holding, the controller sets the filter constant to a value that inhibits the compensation amount from sharply changing. When the state of the steering operation is said turning, the controller changes the filter constant so as to reduce the filtering effect.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, an electric power steering (EPS) apparatus 1 according to one embodiment of the present invention will be described with reference to the drawings.

Figure 1:
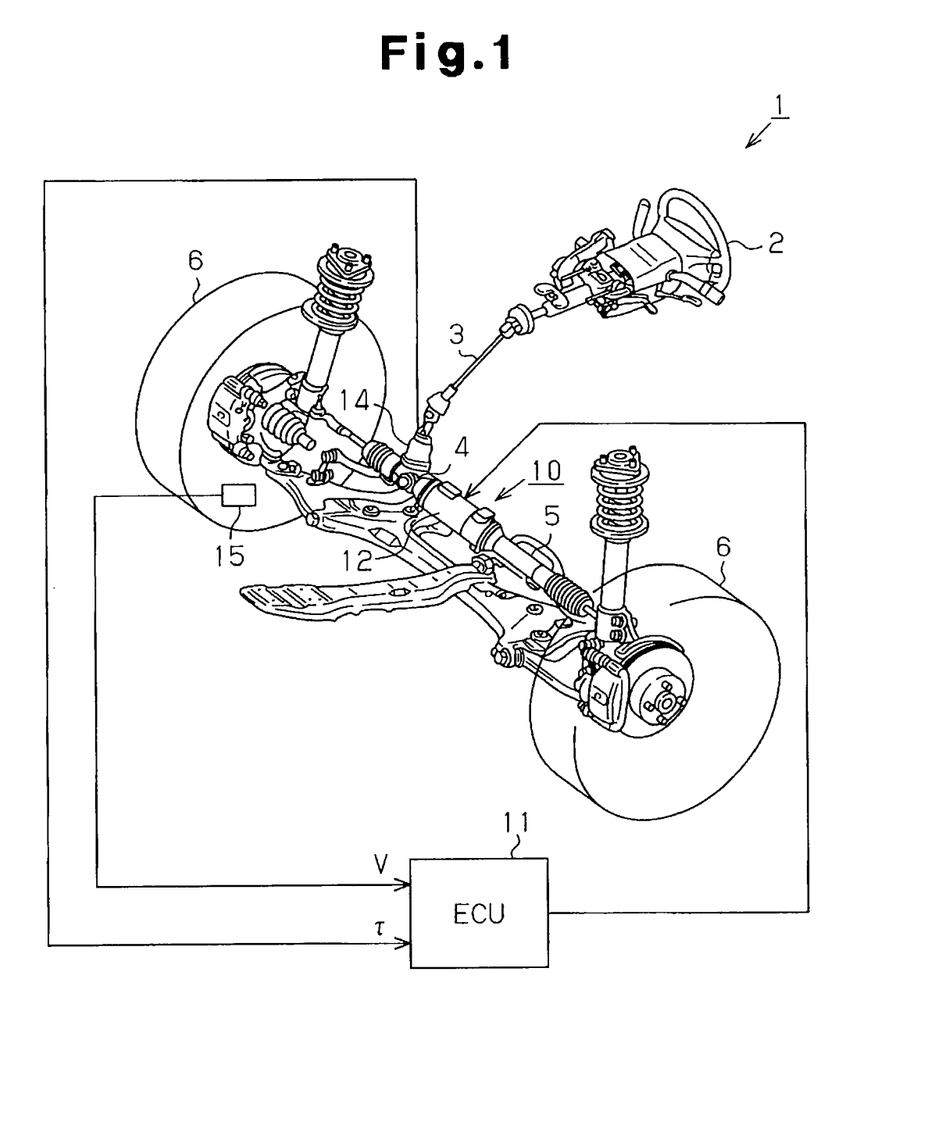
FIG. 1 is a diagrammatic view showing the structure of an electric power steering (EPS) apparatus according to one embodiment of the present invention.

FIG. 1 is a diagrammatic view showing the structure of the EPS apparatus 1 according to the present embodiment. As shown in the drawing, a steering shaft 3 to which a steering wheel 2 is fixed is coupled to a rack 5 with a rack and pinion mechanism 4. Rotation of the steering shaft 3 accompanying a steering operation is converted into a reciprocating linear motion of the rack 5 by the rack-and-pinion mechanism 4. The reciprocating linear motion of the rack 5 changes the steering angle of steerable wheels 6. As the steering angle of the steerable wheels 6 are changed, the advancing direction of the vehicle is changed.

The EPS apparatus 1 includes an EPS actuator 10 and an electronic control unit (ECU) 11 in the steering system. The EPS actuator 10 serves as a steering force assist device, and applies an assist force for assisting steering operation to a steering system, and the ECU 11 serves as a controller for controlling actuation of the EPS actuator 10.

The EPS actuator 10 of the present embodiment is a rack type EPS actuator, which has a rack 5 and a motor 12 serving as a drive source. An assist torque generated by the motor 12 is transmitted to the rack 5 via a ball screw mechanism (not shown). The motor 12 of the preferred embodiment is a brushless motor and is rotated by receiving a three-phase (U, V, W) power from the ECU 11.

A torque sensor 14 and a vehicle speed sensor 15 are connected to the ECU 11. The ECU 11 controls the EPS actuator 10 based on a steering torque τ and a vehicle speed V detected by the torque sensor 14 and the vehicle speed sensor 15, respectively. That is, the ECU 11 computes a target assist force based on the detected steering torque τ and the detected vehicle speed V. Then, the ECU 11 controls the actuation of the EPS actuator 10, that is, assist force applied to the steering system, through supplying drive electricity to the motor 12, which is a drive source, thereby generating the target assist force in the EPS actuator 10.

Next, a description will be given of the assist control in the EPS apparatus 1.

Figure 2:
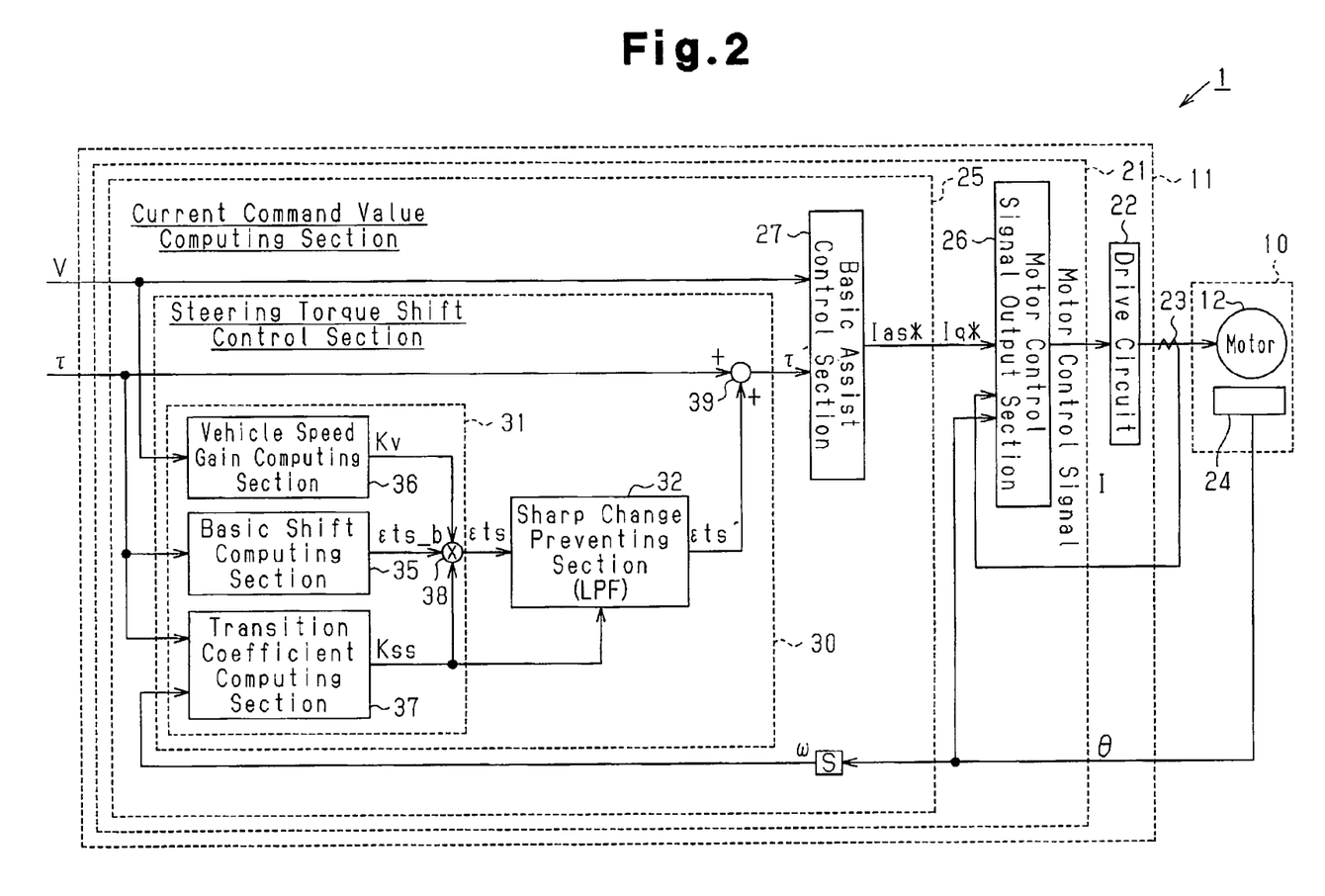
FIG. 2 is a control block diagram of the EPS apparatus of FIG. 1.

FIG. 2 is a control block diagram of the EPS apparatus 1. As shown in FIG. 2, the ECU 11 is provided with a microcomputer 21, which outputs a motor control signal, and a drive circuit 22, which drives the motor 12 based on the motor control signal. The motor 12 is a drive source of the EPS actuator 10. The drive circuit 22 supplies drive electricity to the motors 12.

In the present embodiment, the ECU 11 is connected to a current sensor 23 for detecting an actual current value I applied to the motor 12 and a rotation angle sensor 24 for detecting a rotation angle θ of the motor 12. The microcomputer 21 outputs the motor control signal to the drive circuit 22 based on the actual current value I and the rotation angle θ of the motor 12 detected based on output signals from the sensors 23, 24, the steering torque τ, and the vehicle speed V. Various signals in the control block shown below are controlled through computer programs executed by the microcomputer 21.

Specifically, the microcomputer 21 of the present embodiment includes a current command value computing section 25 and a motor control signal output section 26. The current command value computing section 25 computes a current command value Iq* that corresponds to a target assist force that needs to be generated by the EPS actuator 10. The motor control signal output section 26 outputs a motor control signal based on the current command value Iq* computed by the current command value computing section 25.

The current command value computing section 25 includes a basic assist control section 27. The basic assist control section 27 serves as a computation section that computes a basic assist control amount Ias*, which is a basic component of the target assist force. The basic assist control section 27 receives the steering torque τ (τ') and the vehicle speed V. The basic assist control section 27 computes the basic assist control amount Ias* based on the steering torque τ and the vehicle speed V. Specifically, the basic assist control section 27 increases the absolute value of the basic assist control amount Ias* as the absolute value of the input steering torque τ is increased, and as the vehicle speed V is decreased. The current command value computing section 25 outputs a value based on the basic assist control amount Ias*, which is computed by the basic assist control section 27, to the motor control signal output section 26 as a current command value Iq*, which will be used as the target assist force in the power assist control.

Together with the current command value Iq* computed by the current command value computing section 25, the motor control signal output section 26 receives the actual current I detected by the current sensor 23 and a rotation angle θ of the motor 12 detected by the rotation angle sensor 24. Then, the motor control signal output section 26 computes a motor control signal by executing a current feedback control in such a manner as to make the actual current value I follow the current command value Iq* corresponding to the target assist force.

Specifically, in the present embodiment, the motor control signal output section 26 converts a phase current value (Iu, Iv, Iw) of the motor 12 detected as the actual current value I into d,q-axis current values of a d/q coordinate system (d/q conversion). In this manner, the motor control signal output section 26 performs the current feedback control.

That is, the current command value Iq* is input as a q-axis current command value to the motor control signal output section 26. The motor control signal output section 26 subjects the phase current value (Iu, Iv, Iw) to d/q conversion based on the rotation angle θ detected by the rotation angle sensor 24. The motor control signal output section 26 computes the d,q-axis voltage command value based on the converted d,q-axis current value and the q-axis current command value. Further, the motor control signal output section 26 computes a phase voltage command value (Vu*, Vv*, Vw*) by subjecting the d,q-axis voltage command value to reverse conversion from the d/q coordinate system, and generates a motor control signal based on the phase voltage command value.

The microcomputer 21 outputs the motor control signal, which has been generated in the above described manner, to the drive circuit 22. The drive circuit 22 feeds the three-phase drive electricity based on the motor control signal to the motor 12, whereby the actuation of the EPS actuator 10 is controlled.

[Steering Torque Shift Control]

Next, a steering torque shift control executed by the microcomputer 21 (the current command value computing section 25) will be described.

According to three steering states (the state of steering operation), the microcomputer 21 executes compensation control (steering torque shift control) for correcting the steering torque $\tau$, which is the basis of the power assist control. The three steering states are "turning" for increasing the steering angle, "holding" for maintaining the steering angle, and "returning" for reducing the steering angle. The microcomputer 21 determines to which one of the "turning", "holding", and "returning" the state of the steering operation corresponds.

Specifically, the current command value computing section 25 includes a steering torque shift control section 30, which corrects the steering torque $\tau$. In addition to the steering torque $\tau$, the steering torque shift control section 30 receives the vehicle speed V and the angular velocity $\omega$ of the motor 12. Based on the steering torque $\tau$, the vehicle speed V, and the angular velocity $\omega$, the steering torque shift control section 30 computes a corrected steering torque $\tau'$ by executing the steering torque shift control. Then, the steering torque shift control section 30 sends the steering torque $\tau'$ to the basic assist control section 27.

More specifically, the steering torque shift control section 30 includes a steering torque shift computing section 31, which serves as a compensation section, and an sharp change preventing section 32, which serves as a filtering section. The steering torque shift computing section 31 computes a steering torque shift control amount $\epsilon$ts, which is a compensation amount for executing the steering torque shift control. The sharp change preventing section 32 subjects the steering torque shift control amount $\epsilon$ts to a filtering process, thereby inhibiting the control amount $\epsilon$ts from sharply changing.

The steering torque shift computing section 31 includes a basic shift computing section 35, a vehicle speed gain computing section 36, and a transition coefficient computing section 37. The basic shift computing section 35 computes a basic shift amount $\epsilon$ts_b based on the steering torque $\tau$. The basic shift amount $\epsilon$ts_b is used as a basic component in the steering torque shift control. The vehicle speed gain computing section 36 computes a vehicle speed gain Kv corresponding to the vehicle speed V. The transition coefficient computing section 37 computes a transition coefficient Kss, which indicates the steering state of the driver.

Figure 3:
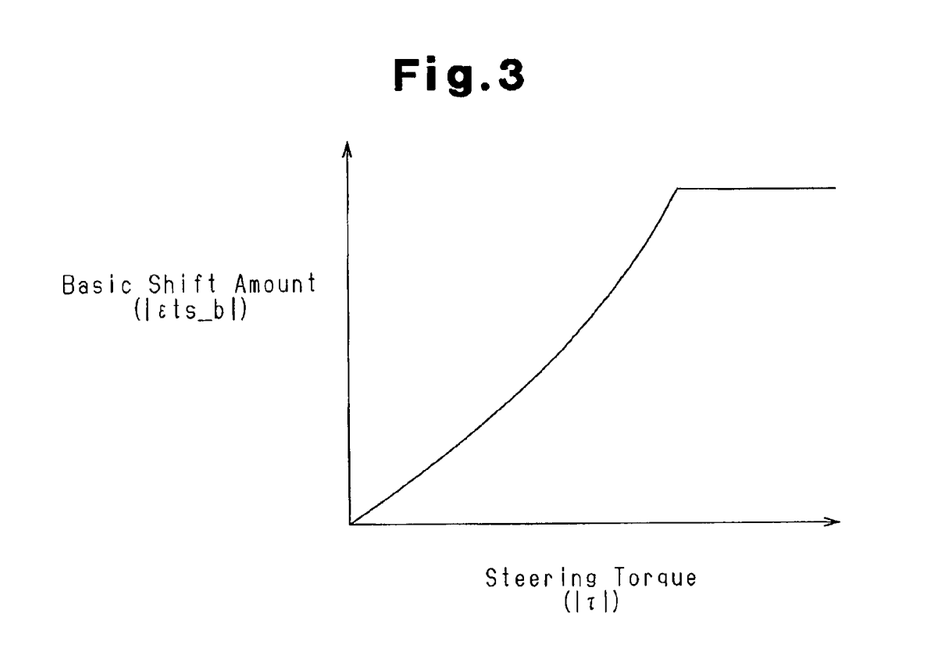
FIG. 3 is a graph showing the relationship between a basic shift amount and steering torque.
Figure 4:
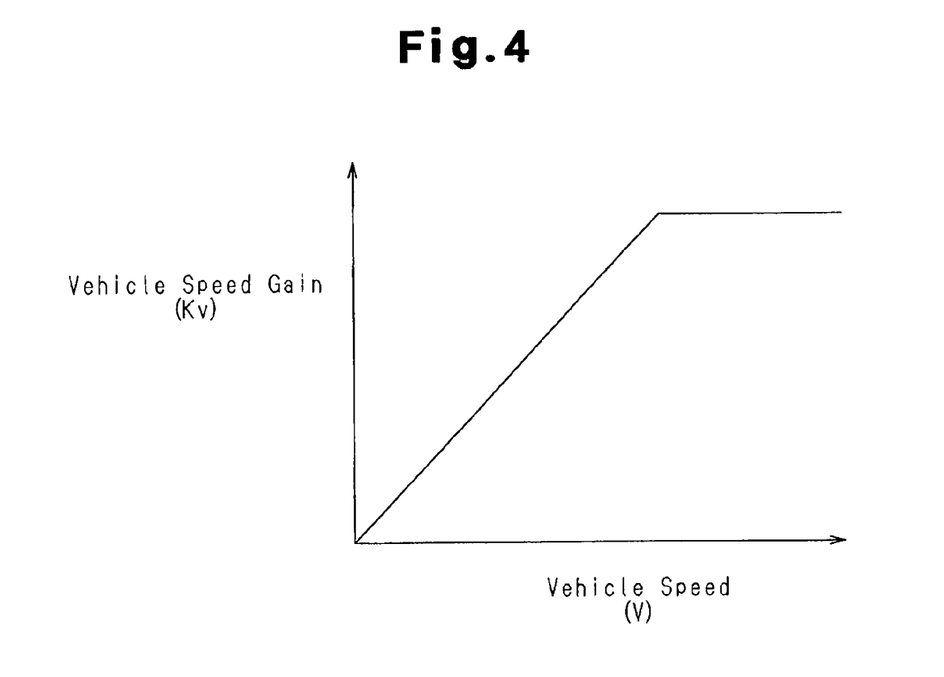
FIG. 4 is a graph showing the relationship between vehicle speed gain and the vehicle speed.

As shown in FIG. 3, the basic shift computing section 35 computes the basic shift amount $\epsilon$ts_b such that the greater the absolute value of the input steering torque $\tau$, the greater the absolute value of the basic shift amount $\epsilon$ts_b becomes. The basic shift computation by the basic shift computing section 35 is executed through a map computation based on a map in which the steering torque $\tau$ and the basic shift amount $\epsilon$ts_b are correlated to each other. The sign of the value of the basic shift amount $\epsilon$ts_b output by the basic shift computing section 35 is the same as the sign of the value of the steering torque $\tau$ received by the basic shift computing section 35. Also, as shown in FIG. 4, the vehicle speed gain computing section 36 computes the vehicle speed gain Kv such that the greater the value of the input vehicle speed V, the value of the vehicle speed gain Kv becomes.

Further, the transition coefficient computing section 37 receives the steering torque $\tau$ and the angular velocity $\omega$ of the motor 12. Based on the sign of the value of the input steering torque $\tau$ (direction of steering) and the angular velocity $\omega$, the transition coefficient computing section 37 computes the transition coefficient Kss, which corresponds to one of the three steering states, or the "turning", "holding", and "returning".

Specifically, the transition coefficient computing section 37 has a map 37a, in which the angular velocity $\omega$ and the transition coefficient Kss are correlated to each other in accordance with the sign of the steering torque $\tau$ (positive: $\tau>0$, negative: $\tau<0$) a shown in FIGS. 5(a) and 5(b). The transition coefficient computing section 37 executes map computation using the map 37a, thereby computing the transition coefficient Kss.

Figure 5A:
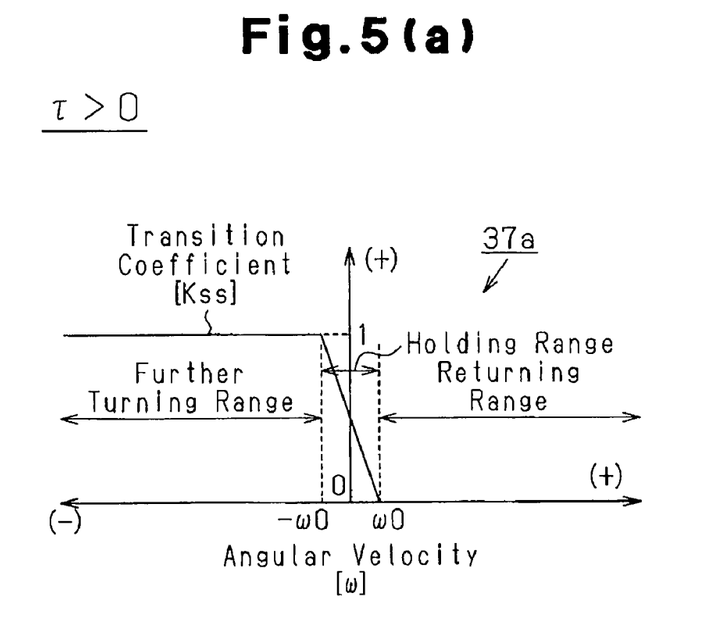
FIG. 5(a) is a graph showing the relationship between a transition coefficient and an angular velocity in a case where the steering torque exceeds zero.

More specifically, when the sign of the steering torque $\tau$ is positive ($\tau>0$), the map 37a shown in FIG. 5(a) is used. The map 37a is divided into three ranges each corresponding to one of the "turning", "returning", and "holding" in accordance with the value of the angular velocity $\omega$ of the motor 12. The range in the vicinity of zero of the angular velocity $\omega$ corresponding to values greater than or equal to a predetermined value $\omega0$ is defined as the range of the "turning". The range corresponding to values less than or equal to a predetermined value $-\omega0$ is defined as the range of the "returning. The range in which the angular velocity $\omega$ is less than the predetermined value $\omega0$ and greater than $-\omega0$ ($-\omega0<\omega<\omega0$) is defined as the range corresponding to the "holding".

Figure 5B:
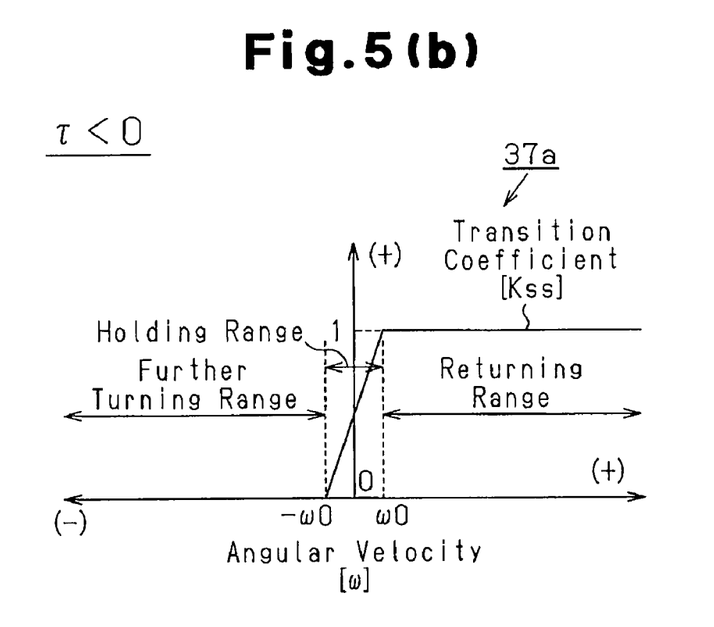
FIG. 5(b) is a graph showing the relationship between the transition coefficient and an angular velocity, in a case where the steering torque is less than zero.

On the other hand, when the sign of the steering torque $\tau$ is negative ($\tau<0$), the map 37a shown in FIG. 5(b) is used. Contrary to FIG. 5(a), the range in the vicinity of zero of the angular velocity $\omega$ corresponding to values greater than or equal to a predetermined value $\omega0$ is defined as the range of the "returning in the map 37a. The range corresponding to values less than or equal to a predetermined value $-\omega0$ is defined as the range of the "turning". The range in which the angular velocity $\omega$ is less than the predetermined value $\omega0$ and greater than $-\omega0$ ($-\omega0<\omega<\omega0$) is defined as the range corresponding to the "holding".

That is, basically, the transition coefficient computing section 37 determines that the range in which the sign of the value of the steering torque $\tau$ and the sign of the value of the angular velocity $\omega$ of the motor 12 are the same corresponds to the "turning", that the range in which the signs are different from each other corresponds to the "returning, and that a predetermined range including $\omega=0$ ($-\omega0<\omega<\omega0$) corresponds to the "holding".

The transition coefficient computing section 37 computes the transition coefficient Kss based on the map 37a described above. That is, when the angular velocity $\omega$ is in the range corresponding to the "turning" ($\tau>0$ and $\omega\geq\omega0$, or $\tau<0$ and $\omega\leq-\omega0$), the transition coefficient computing section 37 sets the transition coefficient Kss to zero. When the angular velocity $\omega$ is in the range corresponding to the "returning ($\tau>0$ and $\omega\leq-\omega0$, or $\tau<0$ and $\omega\geq\omega0$), the transition coefficient computing section 37 sets the transition coefficient Kss to one.

When the angular velocity $\omega$ is in the range corresponding to the "holding" ($-\omega0<\omega<\omega0$), the transition coefficient computing section 37 sets the transition coefficient Kss to a value in a range between one and zero in accordance with the angular velocity $\omega$. That is, in the map 37a, the transition coefficient Kss is set to change from one to zero as the angular velocity $\omega$ shifts from the "returning" range to the "turning" range.

The basic shift amount $\epsilon$ts_b computed by the basic shift computing section 35, the vehicle speed gain Kv computed by the vehicle speed gain computing section 36, and the transition coefficient Kss computed by the transition coefficient computing section 37 are sent to a multiplier 38. The steering torque shift computing section 31 outputs, as the steering torque shift control amount ϵts, a value obtained through multiplication of the basic shift amount ϵts_b, the transition coefficient Kss, and the vehicle speed gain Kv.

On the other hand, the sharp change preventing section 32 is formed by a low pass filter (LPF). By passing through the sharp change preventing section 32, the steering torque shift control amount ϵts output from the steering torque shift computing section 31 is subjected to a filtering process for inhibiting the control amount ϵts from sharply changing (sharp change prevention). The steering torque shift control section 30 superimposes a steering torque shift control amount ϵts', which has been subjected to the filtering process by the sharp change preventing section 32, on the steering torque τ in the adder 39. Accordingly, the steering torque shift control section 30 corrects the input steering torque τ, that is, executes the steering torque shift control, and sends a corrected steering torque τ' to the basic assist control section 27.

In this manner, through the execution of the steering torque shift control, the steering torque shift control amount ϵts is computed to have such a value that, if the steering state is either the "holding" or the "returning," the corrected steering torque τ' increases the basic assist control amount Ias*. As a result, the burden on the driver required for the "holding" is reduced, and the driver is prevented from feeling disturbed when switching from the "holding" to the "returning". When the steering state is the "turning", the steering torque shift control amount ϵts becomes zero. This prevents the occurrence of "lightness of steering" due to excessive assist force, so that the favorable steering feel is maintained.

As described above, the sharp change prevention is executed in conjunction with the assist force increase during the "holding" and the "returning" by the steering torque shift control. In this configuration, if reduction of the increased assist torque is retarded in the "turning" subsequent to the "holding" or the "returning," the assist torque may be excessive. As a result, the steering feel may be degraded. For example, the steering resistance may be too small.

Taking this in consideration, when the steering state is the "turning", the sharp change preventing section 32 changes a filter constant of the low pass filter such that the filtering effect of the low pass filter is reduced compared to the cases of the "turning" and the "holding".

Figure 6:
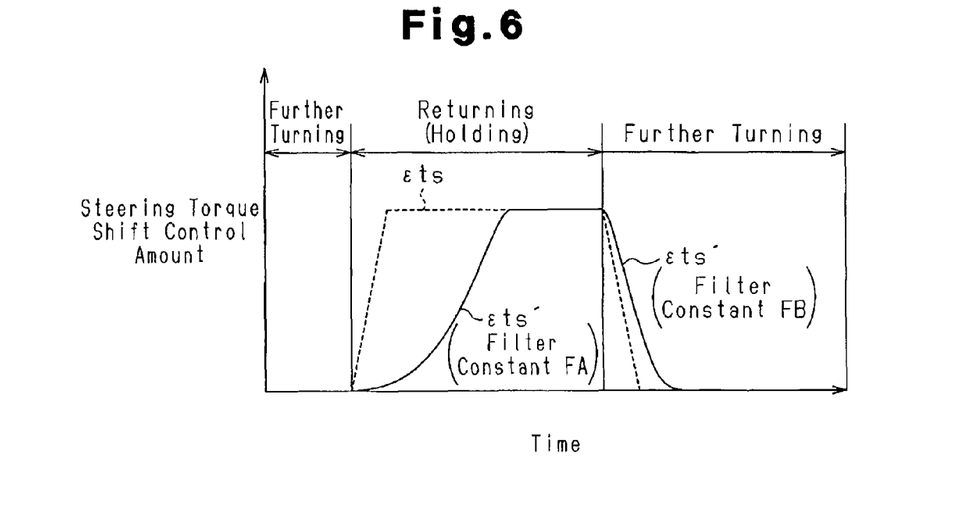
FIG. 6 is a graph showing changes of a filter constant in accordance with the steering state.

That is, as shown in FIG. 6, when the steering state is the "turning" or the "holding", the sharp change preventing section 32 sets a filter constant (filter constant FA) having a great filtering effect so that the rising of the steering torque shift control amount ϵts' is delayed. This inhibits the assist force from sharply changing. When the steering state is the "turning" or the "holding", the sharp change preventing section 32 sets a filter constant (filter constant FB) having a small filtering effect so that the falling of the steering torque shift control amount ϵts' is advanced. This prevents the assist force from being excessive in the subsequent "forward turning", so that the steering feel is not degraded by such an excessive assist force.

More specifically, as shown in FIG. 2, the sharp change preventing section 32 receives the transition coefficient Kss, which has been computed by the transition coefficient computing section 37. The sharp change preventing section 32 switches the filter constant of the low pass filter based on the steering state indicated by the transition coefficient Kss.

Figure 7:
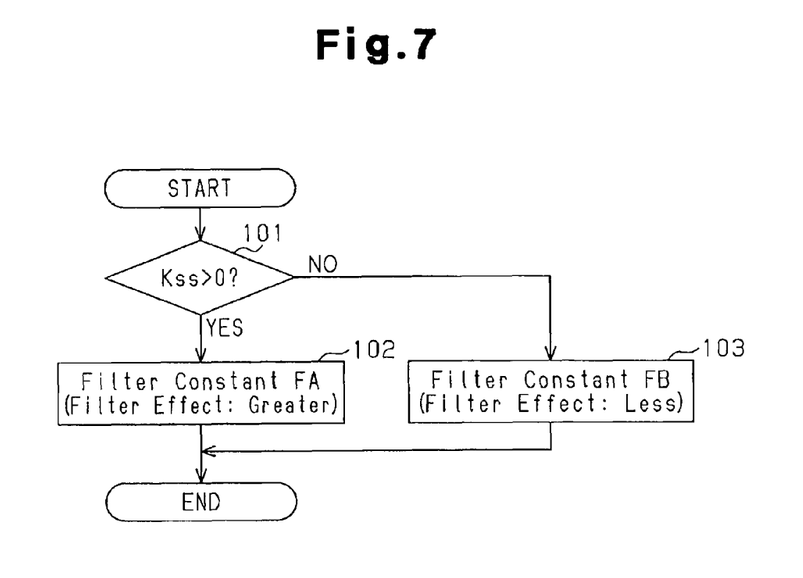
FIG. 7 is a flowchart showing a process for changing the filter constant.
Figure 8:
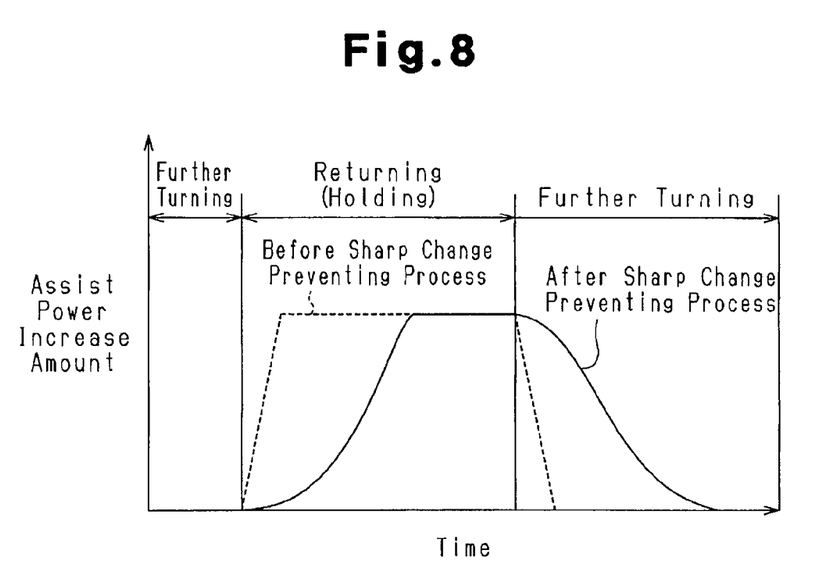
FIG. 8 is a waveform chart showing changes of increase amount of assist force when the steering state is switched to "turning" subsequent to the "returning or the "holding."

That is, as shown in the flowchart of FIG. 7, the sharp change preventing section 32 determines whether the input transition coefficient Kss is greater than zero (step 101). When the transition coefficient Kss is greater than zero (Kss>0, step 101: YES), the sharp change preventing section 32 selects the filter coefficient FA, which has a greater effect of the low pass filter (step 102). On the other hand, when the transition coefficient Kss is equal to zero (Kss=0, step 101: NO), the sharp change preventing section 32 selects the filter coefficient FB, which has a smaller effect of the low pass filter (step 103).

As described above, in the present embodiment, the assist force that has been increased during the "holding" or the "returning" is quickly reduced so that the assist force is inhibited from being excessive in the subsequent "turning", without impairing the effect of the sharp change prevention. As a result, the lightness of response experienced by the driver and the accompanying reduction in the road information and the reduced sensation of the "turning" are prevented from occurring, so that favorable steering feel is ensured.

The present embodiment may be modified as follows.

The steering torque shift computing section 31 of the present embodiment computes, as the steering torque shift control amount ϵts, a value obtained through multiplication of the basic shift amount ϵts_b, the transition coefficient Kss, and the vehicle speed gain Kv. Instead of this, the method for computing the steering torque shift control amount ϵts executed by the steering torque shift computing section 31 may be changed.

In the present embodiment, the steering state of the driver is indicated by the value of the transition coefficient Kss, which is computed based on the steering torque τ and the angular velocity ω of the motor 12. Instead of this, it is possible to determine more directly which one of the three steering states is the current steering state of the driver.

In the present embodiment, the sharp change preventing section 32 selects the filter coefficient FA, which has a great filtering effect, when the steering state is the "turning" or the "holding", and selects the filtering constant FB, which has a small filtering effect, when the steering state is the "turning". Instead of this, for example, the filter constant may be changed continuously such that the greater the steering torque shift control amount ϵts, which is the compensation amount, the greater degree the filtering effect is reduced by. This configuration more effectively inhibits the assist force from being excessive when the steering state is "turning" subsequent to the "holding" or the "returning."

Therefore, the present examples and embodiments are to be considered as illustrative and not restrictive and the invention is not to be limited to the details given herein, but may be modified within the scope and equivalence of the appended claims.

What is claimed is:

1. An electric power steering apparatus, comprising:
a motor;
a steering force assist device that uses the motor as a drive source to apply assist force to a steering system, thereby assisting a steering operation;
a torque sensor for detecting a steering torque of the steering system; and
a controller for controlling an operation of the steering force assist device,
the controller further comprising;
a computation section that computes a basic assist force applied to the steering system based on the steering torque detected by the torque sensor,
a compensation section that computes a compensation amount that compensates for the steering torque used in the computation of the basic assist force, thereby adjusting the basic assist force; and a filtering section that subjects the compensation amount obtained at the compensation section to a filtering process with a filter constant that represents the degree of filtering effect, wherein the state of the steering operation includes a turning for increasing the steering angle, a holding for maintaining the steering angle, and a returning for reducing the steering angle, wherein the controller determines which one of said returning, said holding, and said turning the state of the steering operation is, wherein, when the state of the steering operation is said returning or said holding, the controller sets the filter constant to a value that inhibits the compensation amount from sharply changing, and wherein, when the state of the steering operation is said turning, the controller changes the filter constant so as to reduce the filtering effect.

2. The electric power steering apparatus according to claim 1, wherein the controller changes the filter constant such that the greater the compensation amount, the greater degree the filtering effect is reduced by.

3. The electric power steering apparatus according to claim 1, wherein, when the state of the steering operation is switched to the further steering from the returning or the holding, the controller changes the filter constant so as to reduce the filtering effect.

4. The electric power steering apparatus according to claim 1, wherein the change of the filter constant is executed by selecting one of a filter constant having a smaller filtering effect and a filter constant having a greater filtering effect.

5. The electric power steering apparatus according to claim 1,

Wherein the filtering section includes a low pass filter that executes the filtering process, the filter constant being a filter constant of the low pass filter.

6. The electric power steering apparatus according to claim 1, further comprising a rotation angle sensor that detects an angular velocity of the motor, wherein, based on the sign of the value of the steering torque, the value of the angular velocity detected by the rotation angle sensor, and the sign of the value of the angular velocity, the controller determines which one of the returning, the holding, and the turning the state of the steering operation is.

* * * * *